United States Patent
Wu

(10) Patent No.: US 9,818,017 B2
(45) Date of Patent: *Nov. 14, 2017

(54) FINGERPRINT IDENTIFICATION MODULE

(71) Applicant: Gingy Technology Inc., Hsinchu (TW)

(72) Inventor: Jen-Chieh Wu, Hsinchu (TW)

(73) Assignee: Gingy Technology Inc., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/151,471

(22) Filed: May 10, 2016

(65) Prior Publication Data
US 2017/0011248 A1    Jan. 12, 2017

Related U.S. Application Data

(60) Provisional application No. 62/190,267, filed on Jul. 9, 2015.

(30) Foreign Application Priority Data

Dec. 7, 2015    (TW) .............................. 104140901 A

(51) Int. Cl.
*G06K 9/00*    (2006.01)

(52) U.S. Cl.
CPC ................................ *G06K 9/00046* (2013.01)

(58) Field of Classification Search
CPC ............. G06K 9/0004; G06K 9/00046; G06K 9/00013; G06K 9/00053; G06K 9/0002; G06K 9/00006; G06K 9/0012; G06K 9/0008
See application file for complete search history.

(56) References Cited

U.S. PATENT DOCUMENTS

| 4,932,776 | A | * | 6/1990 | Dowling, Jr. | ...... G06K 9/00046 356/71 |
| 2003/0118219 | A1 | | 6/2003 | Higuchi et al. | |
| 2004/0218085 | A1 | * | 11/2004 | Sugawara | ................ G02B 6/06 348/340 |

(Continued)

FOREIGN PATENT DOCUMENTS

| TW | I222033 | 10/2004 |
| TW | M301406 | 11/2006 |
| TW | I267790 | 12/2006 |

OTHER PUBLICATIONS

"Office Action of Taiwan Counterpart Application," dated Oct. 19, 2016, p. 1-p. 5, in which the listed reference was/references were cited.

*Primary Examiner* — Jingge Wu
(74) *Attorney, Agent, or Firm* — JCIPRNET

(57) ABSTRACT

A fingerprint identification module includes a cover plate, a fingerprint identification sensor, at least one light source, and a plurality of fibers. The cover plate has an inner surface and an outer surface opposite to the inner surface. The fingerprint identification sensor and the at least one light source are located under the inner surface, and the at least one light source is located adjacent to the fingerprint identification sensor. The fibers are arranged in an array and are located between the cover plate and the fingerprint identification sensor, wherein each of the fibers has a light incident surface. The light incident surface faces the inner surface and is inclined relative to the inner surface.

9 Claims, 3 Drawing Sheets

(56) References Cited

U.S. PATENT DOCUMENTS

| | | | | |
|---|---|---|---|---|
| 2008/0020641 | A1* | 1/2008 | Hiew | H01L 24/97 439/607.01 |
| 2009/0087044 | A1* | 4/2009 | Mizushima | G06K 9/00026 382/124 |
| 2010/0289886 | A1 | 11/2010 | Finrich et al. | |
| 2012/0200812 | A1* | 8/2012 | Qi | B23K 26/38 349/106 |
| 2013/0169590 | A1* | 7/2013 | Wickboldt | G02B 1/105 345/174 |
| 2014/0268871 | A1* | 9/2014 | Morgan | H01L 31/0543 362/607 |
| 2015/0369661 | A1* | 12/2015 | Lin | G06K 9/0004 250/227.11 |
| 2016/0132712 | A1* | 5/2016 | Yang | G06K 9/0002 348/77 |
| 2016/0247010 | A1* | 8/2016 | Huang | G02B 5/20 |

* cited by examiner

FINGERPRINT IDENTIFICATION MODULE

CROSS-REFERENCE TO RELATED APPLICATION

This application claims the priority benefits of U.S. provisional application Ser. No. 62/190,267, filed on Jul. 9, 2015, and Taiwan application serial no. 104140901, filed on Dec. 7, 2015. The entirety of each of the above-mentioned patent applications is hereby incorporated by reference herein and made a part of this specification.

BACKGROUND OF THE INVENTION

1. Field of the Invention

The present invention relates to an optical module, and more particularly to a fingerprint identification module.

2. Description of Related Art

As technology develops, a great number of electronic devices such as tablet computers and smart phones have been applied to daily life. These electronic devices usually include a password lock, in order to increase security. However, in order to unlock the password lock, the user must input a password every time before the use of the electronic device. In order to solve the inconvenience of conventional password unlocking, and also take into consideration the security and convenience of the electronic device, the industry has been researching the application of fingerprint identification modules in electronic devices. This way, the fingerprint information of the user may serve as an identification of the user for the electronic device.

SUMMARY OF THE INVENTION

The invention provides a fingerprint identification module having a high identification rate.

A fingerprint identification module of the invention includes a cover plate, a fingerprint identification sensor, at least one light source, and a plurality of fibers. The cover plate has an inner surface and an outer surface opposite to the inner surface. The fingerprint identification sensor and the at least one light source are located under the inner surface, and the at least one light source is located adjacent to the fingerprint identification sensor. The fibers are arranged in an array and are located between the cover plate and the fingerprint identification sensor. Each of the fibers has a light incident surface. The light incident surface faces the inner surface and is inclined relative to the inner surface.

In an embodiment of the invention, the cover plate is a glass cover of a display device or a touch device.

In an embodiment of the invention, the fingerprint identification sensor is an optical fingerprint identification sensor or an optical electrical fingerprint identification sensor (hybrid fingerprint identification sensor).

In an embodiment of the invention, the at least one light source is a plurality of light sources, and the light sources are respectively disposed on each side, each corner, or a combination of each side and each corner of the array.

In an embodiment of the invention, an extension direction of each fiber is perpendicular to the fingerprint identification sensor.

In an embodiment of the invention, an angle is between each light incident surface and the inner surface, and the angle is within a range of 43 degrees to 60 degrees.

In an embodiment of the invention, each of the fibers includes a core and a core casing surrounding the core. A refractive index of the core is greater than 1.81, and a refractive index of the core casing is greater than 1 and less than or equal to 1.48.

In an embodiment of the invention, the fingerprint identification sensor further includes a first adhesive layer and a second adhesive layer. The fibers are connected to the cover plate through the first adhesive layer, and the fibers are connected to the fingerprint identification sensor through the second adhesive layer.

In an embodiment of the invention, the first adhesive layer and the second adhesive layer are light cured adhesive layers.

Based on the above, since the light incident surfaces of the fibers are inclined relative to the inner surface of the cover plate, the light incident angles of light beams may be effectively controlled. Thus, the light beams that enter the fibers may satisfy the conditions for total internal reflection (TIR), and through TIR be transmitted to the fingerprint identification sensor. The aforementioned design may reduce the amount of light loss, and may improve the identification rate of the fingerprint identification module. Thus, the fingerprint identification module of the embodiment of the invention may have a high identification rate.

Several exemplary embodiments accompanied with figures are described in detail below to further describe the disclosure in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
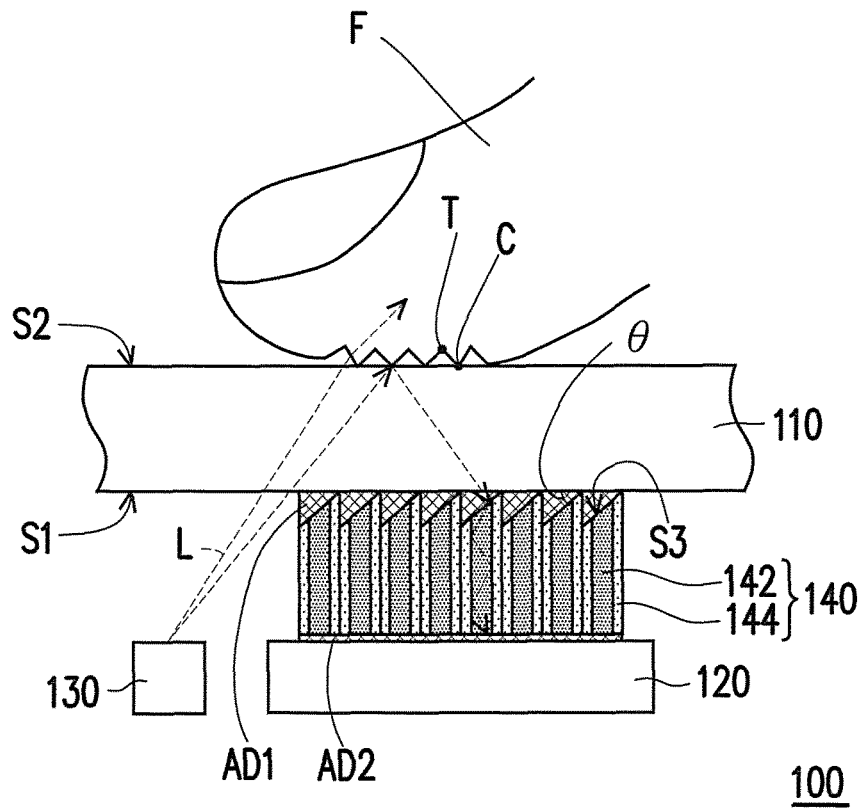
FIG. 1 is a cross-sectional schematic diagram of a fingerprint identification module according to a first embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a cross-sectional schematic diagram of a fingerprint identification module according to a first embodiment of the invention. Referring to FIG. 1, a fingerprint identification module 100 includes a cover plate 110, a fingerprint identification sensor 120, at least one light source 130, and a plurality of fibers 140. FIG. 1 shows one light source, however, the quantity of the light source 130 is not limited thereto.

The cover plate 110 includes an inner surface S1 and an outer surface S2 opposite to the inner surface S1. The outer surface S2 of the cover plate 110 is a touch operating surface of the fingerprint identification module 100. In other words, a finger F of the user touches the outer surface S2 of the cover plate 110, so as to perform fingerprint identification. The cover plate 110 may be a substrate with high mechanical strength, so as to prevent damage to the components below the cover plate 110 due to the pressure from the finger F or other external forces. In addition, a material of the cover plate 110 is a transparent material, so that the light beams L from the light source 130 are not covered up or blocked. The aforementioned transparent material refers to any common material with high light transmittance, and is not limited to materials with 100% transmittance. For example, the cover glass 110 may be a glass cover, such as the glass cover of a display device or a touch device, but is not limited thereto.

The fingerprint identification sensor 120 and the light source 130 are located below the inner surface S1. The light source 130 is located adjacent to the fingerprint identification sensor 120. The light source 130 is adapted to emit the light beams L toward the cover glass 110. The light source 130 may be a visible light source or an invisible light source. In other words, the light beams L may be visible light or invisible light. The fingerprint identification sensor 120 is adapted to receive the light beams L reflected from the finger F, so as to perform identification of the user. For example, the fingerprint identification sensor 120 may be an optical fingerprint identification sensor or an optical electrical fingerprint identification sensor (which is also known as a hybrid fingerprint identification sensor), but is not limited thereto.

The fibers 140 are arranged in an array, and the fibers 140 are located between the cover plate 110 and the fingerprint identification sensor 120. An extension direction of the fibers 140 are perpendicular to the fingerprint identification sensor 120. An arrangement direction of the fibers 140 is parallel to the fingerprint identification sensor 120.

When the user uses his or her finger F to press the outer surface S2 of the cover plate 110, the light beams L irradiating the crests C of the fingerprint of the finger F will be reflected by the crests C. The light beams L irradiating the troughs T of the fingerprint of the finger F will be scattered by the troughs T or absorbed by the finger F. The light beams L reflected by the crests C sequentially pass through the inner surface S1 and the fibers 140 to be transmitted to the fingerprint identification sensor 120. Accordingly, the fingerprint identification sensor 120 may perform identification of the user according to the grayscale digital image from the crests C and the troughs T. In other embodiments, the light beams L may be reflected by the outer surface S2 at the troughs T and absorbed or scattered by the crests C.

Each fiber 140 has a light incident surface S3. The light incident surface S3 faces the inner surface S1, and the light beams L reflected by the crests C enter the fibers 140 through the light incident surfaces S3. Each of the fibers 140 includes a core 142 and a core casing 144 surrounding the core 142. When an incident angle of the light beams L is greater than a critical angle, most of the light beams L entering the core 142 are transmitted to the fingerprint identification sensor 120 through total internal reflection. On the other hand, when an incident angle of the light beams L is smaller than a critical angle, most of the light beams L entering the core 142 likely pass through the core casing 144, and cannot effectively be transmitted to the fingerprint identification sensor 120. By having the light incident surface S3 of each of the fibers 140 be inclined relative to the inner surface S1 of the cover plate 110, an incident angle of the light beams L may be greater than the critical angle, so as to satisfy the conditions for total internal reflection. This way the light beams L may be transmitted to the fingerprint identification sensor 120 through total internal reflection. Reducing the amount of energy loss due to not satisfying the conditions for total internal reflection may improve the identification rate of the fingerprint identification module 100. Thus, the fingerprint identification module 100 of the embodiment has a high identification rate. The light incident surface S3 being inclined relative to the inner surface S1 of the cover plate 110 means there is an angle $\theta$ between each light incident surface S3 and the inner surface S1. The angle $\theta$ is between 0 degrees and 90 degrees. In other words, the light incident surface S3 is not perpendicular or parallel to the inner surface S1.

The angle $\theta$ may be adjusted according to the difference in refractive indexes of the cover plate 110 and the core 142 of the fibers 140. In the embodiment, the cover plate (glass cover) has a refractive index of 1.5, and the refractive index of the core 142 of each fiber 140 is greater than 1.81. The refractive index of the core casing 144 is greater than 1 and less than or equal to 1.48. In addition, the angle $\theta$ may be in a range of 43 degrees to 60 degrees.

According to different design requirements, the fingerprint identification module 100 may further include other components. For example, the fingerprint identification module 100 may further include a first adhesive layer AD1 and a second adhesive layer AD2. The fibers 140 are connected to the cover plate 110 through the first adhesive layer AD1, and the fibers 140 are connected to the fingerprint identification sensor 120 through the second adhesive layer AD2. The first adhesive layer AD1 and the second adhesive layer AD2 may be translucent adhesive layers. However, the invention is not limited thereto. In addition, the refractive indexes of the first adhesive layer AD1 and the second adhesive layer AD2 may be the same as the refractive index of the core 142, but is not limited thereto.

Figure 2:
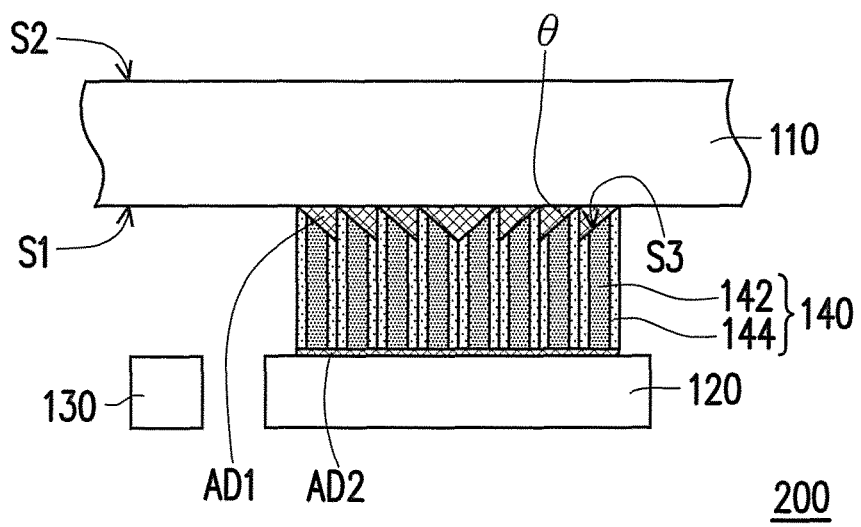
FIG. 2 is a cross-sectional schematic diagram of a fingerprint identification module according to a second embodiment of the invention.

FIG. 2 is a cross-sectional schematic diagram of a fingerprint identification module according to a second embodiment of the invention. Referring to FIG. 2, the fingerprint identification module 200 is similar to the fingerprint identification module 100 of FIG. 1. Same or similar elements will use the same reference numbers, and the same description of the configuration of functions of the same elements will not be repeated herein. The main difference between the fingerprint identification module 200 and the fingerprint identification module 100 is that all the light incident surfaces S3 of the fibers 140 in FIG. 1 face the same direction, and in FIG. 2, the light incident surfaces S3 of the fibers 140 face different directions. Specifically, all the light incident surfaces S3, for example, face a center formed by the array arrangement of the fibers 140. However, the invention is not limited thereto.

Figure 3:
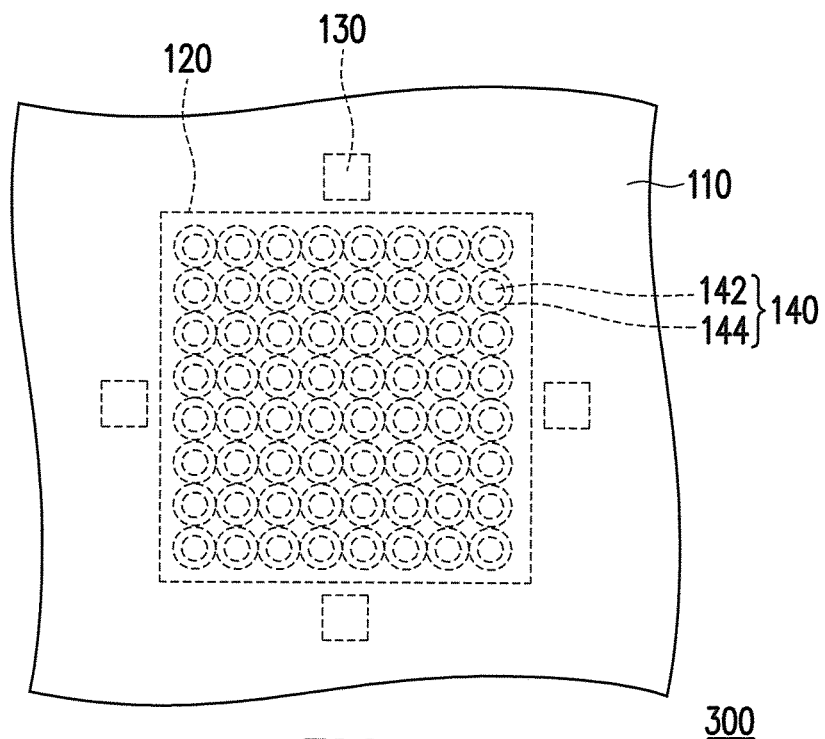
FIG. 3 to FIG. 5 are respectively partial top views of a fingerprint identification module according to a third embodiment to a fifth embodiment of the invention.
Figure 4:
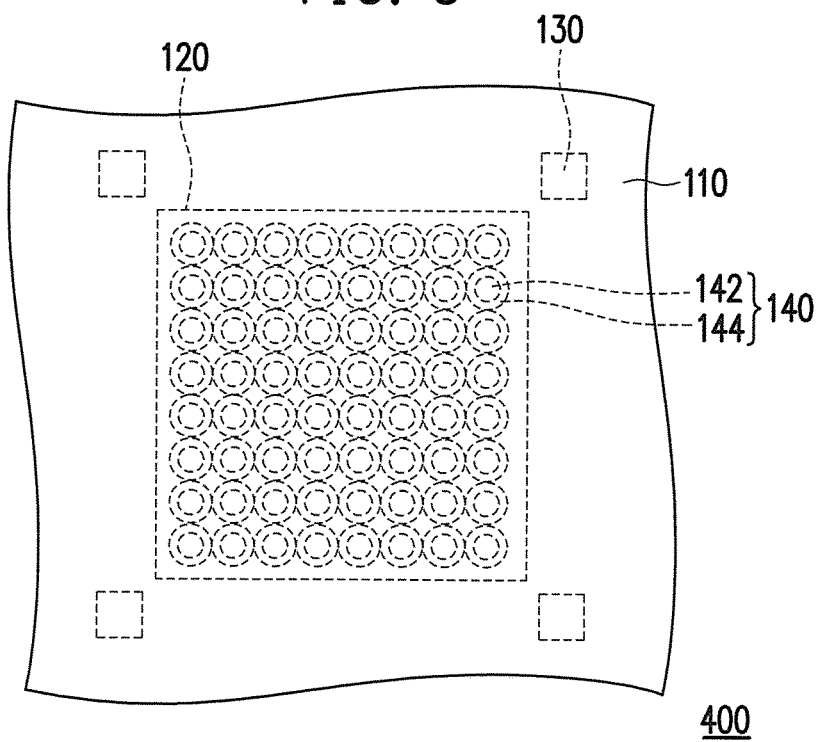
Figure 5:
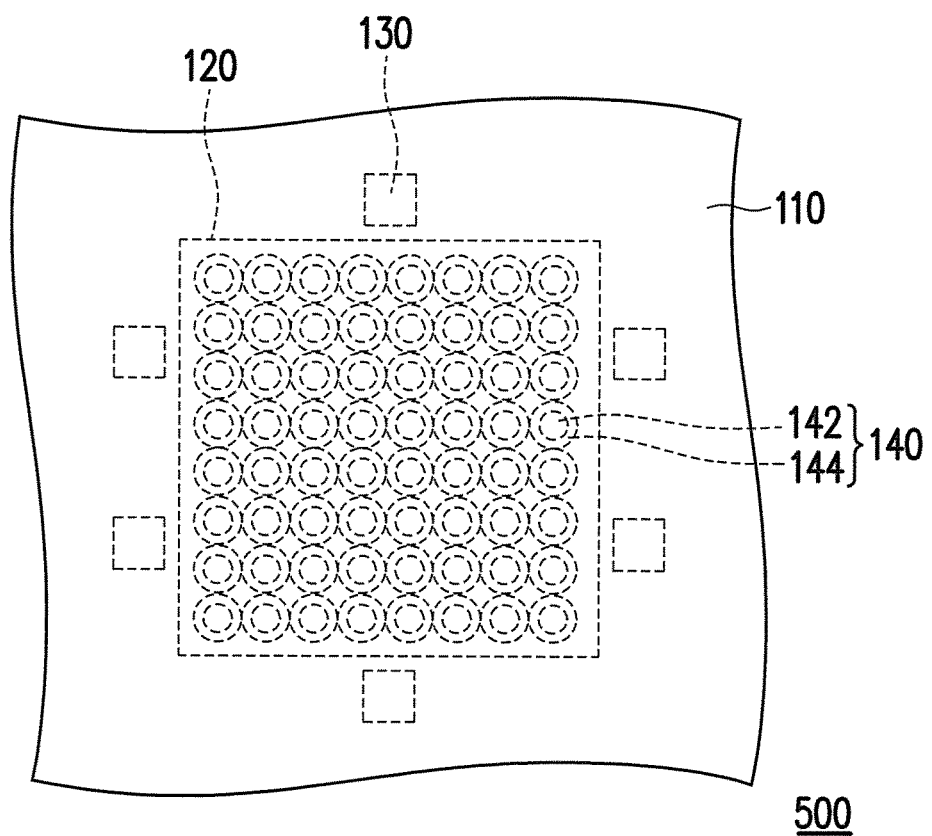

FIG. 3 to FIG. 5 are respectively partial top views of a fingerprint identification module according to a third embodiment to a fifth embodiment of the invention. Referring to FIG. 3 to FIG. 5, the fingerprint identification modules 300, 400, 500 are similar to the fingerprint identification module 100 of FIG. 1. Same or similar elements will use the same reference numbers, and the same description of the configuration of functions of the same elements will not be repeated herein. The main difference between the fingerprint identification modules 300, 400, 500 and the fingerprint identification module 100 is that an amount of the light sources 130 is plural in the fingerprint identification modules 300, 400, 500. In addition, in the fingerprint identification modules 300, 400, 500 the respective configuration of the light sources 130 on each of the sides, corners, or a combination thereof of the array formed by the fibers 140 is different. It should be noted that in FIG. 3 to FIG. 5, only three types of arrangements of the light sources 130 are shown, but the invention is not limited thereto.

To sum up, the fingerprint identification module of the embodiment controls the light incident angle of the light beams through the design of the light incident surfaces of the fibers being inclined relative to the inner surface. Thus, the light beams that enter the fibers may satisfy the conditions for total internal reflection (TIR), and through TIR be transmitted to the fingerprint identification sensor. Thus, the fingerprint identification module of the embodiment of the invention may have a high identification rate.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A fingerprint identification module, comprising:
    a cover plate, having an inner surface and an outer surface opposite to the inner surface;
    a fingerprint identification sensor, located under the inner surface;
    at least one light source, located under the inner surface and adjacent to the fingerprint identification sensor; and
    a plurality of fibers, arranged in an array and located between the cover plate and the fingerprint identification sensor, wherein each of the fibers has a light incident surface, and the light incident surface faces the inner surface of the cover plate and is inclined relative to the inner surface of the cover plate, wherein an optical axis of each of the fibers is perpendicular to the inner surface of the cover plate.

2. The fingerprint identification module as claimed in claim 1, wherein the cover plate is a glass cover of a display device or a touch device.

3. The fingerprint identification module as claimed in claim 1, wherein the fingerprint identification sensor is an optical fingerprint identification sensor or an optical electrical fingerprint identification sensor.

4. The fingerprint identification module as claimed in claim 1, wherein the at least one light source is a plurality of light sources, and the light sources are respectively disposed on each side, each corner, or a combination of each side and each corner of the array.

5. The fingerprint identification module as claimed in claim 1, wherein an extension direction of each fiber is perpendicular to the fingerprint identification sensor.

6. The fingerprint identification module as claimed in claim 1, wherein an angle is between each light incident surface and the inner surface, and the angle is within a range of 43 degrees to 60 degrees.

7. The fingerprint identification module as claimed in claim 1, wherein each of the fibers includes a core and a core casing surrounding the core, wherein a refractive index of the core is greater than 1.81, and a refractive index of the core casing is greater than 1 and less than or equal to 1.48.

8. The fingerprint identification module as claimed in claim 1, further comprising:
    a first adhesive layer and a second adhesive layer, wherein the fibers are connected to the cover plate through the first adhesive layer, and the fibers are connected to the fingerprint identification sensor through the second adhesive layer.

9. The fingerprint identification module as claimed in claim 8, wherein the first adhesive layer and the second adhesive layer are light cured adhesive layers.

* * * * *